Oct. 22, 1946.    J. H. FOULGER ET AL    2,409,749
INDICATING SYSTEM
Filed Nov. 20, 1943
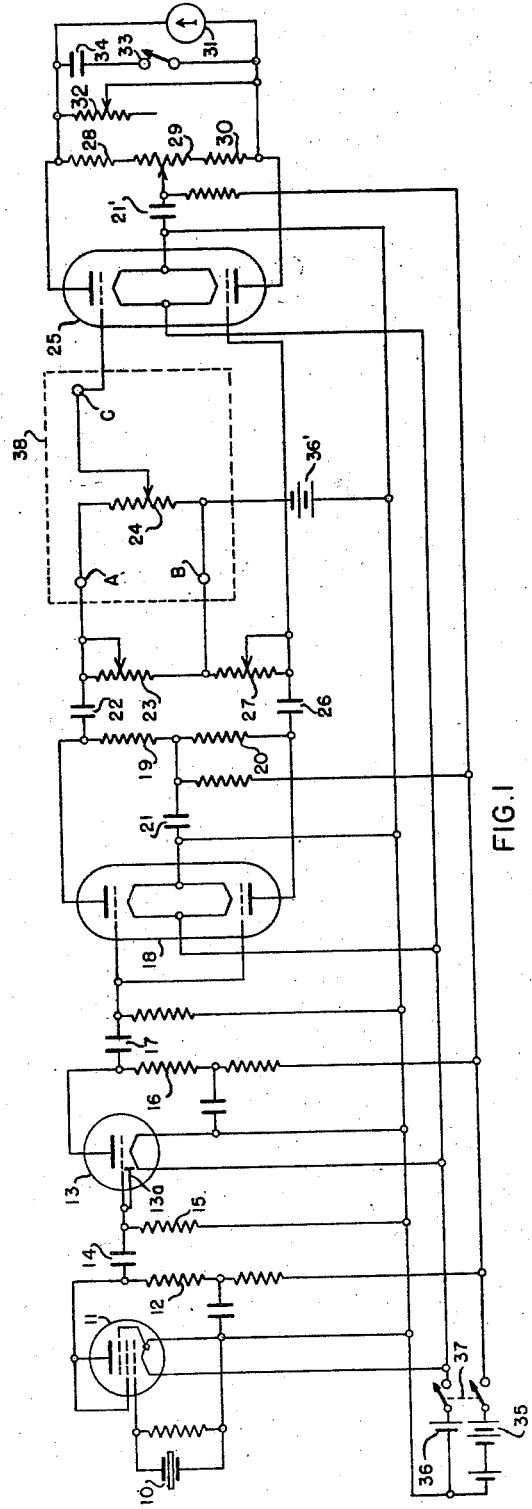
INVENTORS
JOHN H. FOULGER
PAUL E. SMITH, JR
BY Harry C. Page
ATTORNEY Patented Oct. 22, 1946

2,409,749

UNITED STATES PATENT OFFICE 2,409,749

INDICATING SYSTEM

John H. Foulger and Paul E. Smith, Jr., Wilmington, Del., assignors to E. I. du Pont de Nemours & Company, Wilmington, Del., a corporation of Delaware Application November 20, 1943, Serial No. 511,030

9 Claims. (Cl. 128—2.06)

This invention relates generally to systems for indicating the relative content of a predetermined characteristic in two frequency spectrums, one of which is substantially contained within the other, and, while the invention is of general application, it is particularly suitable for indicating changes in the energy content of human heart sounds.

It is frequently desirable to measure or to indicate changes in a predetermined characteristic within a predetermined frequency spectrum; for example, it is frequently desirable to measure changes in the energy-frequency characteristic of heart sounds. Where the phenomenon to be measured consists of a single frequency component, the frequency of which may shift, it is relatively easy to provide a suitable indication of frequency changes. However, where the phenomenon to be investigated comprises a large number of frequency components, it is not sufficient to measure single frequency changes. In some prior art systems it has been customary, when measuring heart sounds, to consider only the major frequency components or, at most, a few frequency components. For example, one prior art system for such purposes provides an indication of the amplitude as well as an indication of the frequency of the major sound component of a heart sound spectrum. However, this is not entirely satisfactory for the reason that a considerable portion of the energy of the spectrum of heart sounds may be in other frequency components of the complex sound wave.

Also, in many cases, where measurements of the type under consideration are to be made, there are present undesired components which should not be included in the measured result. For example, in measuring heart sounds it frequently happens that continuous low-amplitude signals caused by breathing, muscle tremors, etc., are present. Such undesired components may cause errors in both the frequency and amplitude indications. Therefore, it is particularly desirable to provide an arrangement of the general type under consideration which is substantially unresponsive to such undesired signal components.

It is an object of the invention, therefore, to provide an improved indicating system which is not subject to one or more of the above-mentioned disadvantages.

It is another object of the invention to provide an indicating system for indicating the relative content of a predetermined characteristic, for example for indicating the relative energy content, or the relative amplitude content, in two predetermined frequency spectrums, one of which is substantially wholly contained in the other.

It is a specific object of the invention to provide an improved system for measuring the performance of a heart, for example, of a human heart.

It is still another object of the invention to provide a system of the type under consideration which is substantially insensitive to undesired components of relatively low amplitude such as those produced by breathing, body motion, etc., where the performance of a heart is being examined.

In accordance with the invention, a cardiometer for indicating the relative content of a predetermined characteristic in two predetermined frequency spectrums of heart sounds, one of which is substantially contained within the other, comprises means for deriving and translating a first electrical signal corresponding to the content of one of the spectrums of heart sounds and means including a series condenser and a shunt resistor for deriving and translating a second electrical signal corresponding to the content of the other of the spectrums of heart sounds. The system also comprises means, coupled to the means for deriving and translating the above-mentioned first signal, for deriving a third signal varying in accordance with the content of said predetermined characteristic in the first electrical signal, as well as means, coupled to the means for deriving and translating the above-mentioned second signal, for deriving a fourth signal varying in accordance with the content of the above-mentioned predetermined characteristic in the second electrical signal. Means differentially responsive to the above-mentioned third and fourth signals are provided for indicating the above-mentioned relative content of the two spectrums.

For a better understanding of the present invention, together with other and further objects thereof, reference is had to the following description taken in connection with the accompanying drawing, and its scope will be pointed out in the appended claims.

Fig. 1 of the drawing is a circuit diagram, partly schematic, of a complete indicating system in accordance with the invention which is useful for measuring the performance of a human heart, while Fig. 2 illustrates a modification of a portion of the circuit of Fig. 1.

Referring now more specifically to Fig. 1 of the drawing, the system illustrated is useful for indicating changes in the relative content of a predetermined characteristic in two predetermined frequency spectrums, one of which is substantially contained within the other. This system is particularly useful in measuring the performance of a human heart where it is found that a considerable portion of the heart sounds is contained in a low-frequency spectrum. Therefore, in accordance with the specific embodiment of the invention illustrated, the heart performance is measured by a comparison of the energy content of the total spectrum of an adequate sample of heart sounds with the energy content of only a portion of the total frequency spectrum of this sample. Specifically, the energy content of a predetermined frequency spectrum which is wholly contained within the frequency spectrum comprising the total sample of heart sounds is compared with the energy within the frequency spectrum comprising the total sample of heart sounds. Additionally, low-amplitude signals caused by breathing, etc., are preferably eliminated from the signals which are compared.

The arrangement illustrated, therefore, comprises a crystal microphone 10 adapted to convert an adequate sample of all of the heart sounds of a patient into corresponding electrical components. This crystal microphone may be associated with any suitable device (not shown) for conveying heart sounds thereto and is coupled to the input circuit of a vacuum-tube amplifier 11, having a load resistor 12, from which signals are coupled, through a coupling condenser 14 and grid-leak resistor 15, to a succeeding amplifier stage including an amplifier tube 13. The tube 13 is preferably of the diode-triode type and the diode anode 13a thereof is connected externally of the tube to the control electrode of the tube. Tube 13, the triode section of which is preferably of the sharp cut-off type, is provided with a load resistor 16 from which potentials of like polarity are coupled, through coupling condenser 17, to the control electrodes of a succeeding balanced-amplifier stage including a double-triode tube 18. Load resistors 19 and 20 are provided for tube 18 and their common junction is coupled to the cathode of tube 18 through condenser 21 for alternating currents. Signals corresponding to the entire frequency spectrum of the signals translated by the triode section of tube 13 are coupled from load resistor 19, through a circuit including condenser 22 and resistors 23 and 24 connected as shown, to the input circuit of one section of a succeeding double-triode tube 25. Signals corresponding to only a portion of the entire frequency spectrum of signals translated by the triode section of tube 13 are coupled from load resistor 20 to the input circuit of the other triode section of tube 25 through a circuit including condenser 26 and resistor 27 connected as shown. The tube 25 is provided with a balanced output circuit including resistors 28, 29 and 30 connected in series between the anodes of tube 25, a tap on resistor 29 being connected to the cathode of tube 25 by a condenser 21'. The signals amplified in the two sections of tube 25 are applied differentially to a meter 31, a resistor 32, having an adjustable value, being connected across the meter terminals. Meter 31 is preferably a microammeter or a galvanometer. Provision is also made by means of a switch 33 so that a condenser 34 can be connected across the meter terminals. Suitable anode operating potentials are provided for the tubes by a source of potential 35 while suitable filament voltages are provided for the tubes by means of a source of supply 36, the various tubes being adapted to be energized through a double-pole single-throw switch 37. Control-electrode biasing potentials for tube 25 are provided by a source of potential 36'.

In considering the operation of the system just described, it will be assumed that an adequate sample of all of the sounds corresponding to a heart to be examined are picked up by the microphone 10 and converted into electrical frequency components which are amplified in the tube 11, the amplified signals being applied to tube 13 for further amplification. The function of the diode portion of tube 13 will be considered more specifically hereinafter. Signals which are amplified in tube 13 are applied with like polarity to the two input circuits of tube 18 so that a balanced output signal is obtained across the two load circuits of tube 18. The values of condenser 22 and resistor 23 are such that the entire frequency spectrum corresponding to the signals translated by the triode section of tube 13 is translated to the input circuit of the upper triode section of tube 25. However, the values of condenser 26 and resistor 27 are such that the lower frequency components of this spectrum are not translated to the input circuit of the lower triode section of tube 25, only the higher frequency components of the spectrum being translated thereto. It is possible, therefore, to adjust the tap on resistor 24 to such a position that the energy content of the signals translated by the upper section of tube 25 is equal to that of the energy content of the signal translated by the lower section of tube 25. Under these conditions, the meter 31, which is preferably of the zero-center type, will have no voltage applied thereto and will thus provide no indication. However, under certain conditions important in medicine, a shift in certain frequencies of the normal frequency spectrum may be encountered so that a major portion of the energy is contained in the higher frequencies of the heart spectrum. Under these conditions, the voltage developed in the load circuit of the upper triode section of the tube 25 will no longer be equal to the voltage developed in the lower triode section thereof and this shift in frequency can easily be observed on the meter 31.

In some cases with a properly designed microphone properly placed on the chest to pick up heart sounds, sounds caused by breathing, muscle tremors and normal room noise, while of low intensity, may seriously interfere with measurements of the type described above. It is for the purpose of excluding these undesirable components that the diode section of tube 13 is provided. The time constant of the circuit including condenser 14 and grid-leak resistor 15 is so chosen that a large grid current flows when the normally unbiased grid of tube 13 is driven positive and the condenser 14 is thereby charged negatively, biasing the tube 13 towards its cut-off point. The rate at which this charge on condenser 14 leaks off through resistor 15 determines the length of time during which this control action with respect to undesired signals is maintained. The circuit is preferably proportioned so that the condenser charges very quickly and discharges relatively slowly. A bias for tube 13 is therefore developed from the signal translated which is effective to stabilize the positive peaks of the signal translated at the zero grid-voltage point on the characteristic of the triode section of tube 13. In this manner the undesired low-amplitude components mentioned above are caused to fall below the cut-off point of tube 13 and are not translated thereby. In this manner the effect of the undesired components mentioned above is eliminated or very much reduced.

Resistor 32 is provided across meter 31 for adjusting the sensitivity thereof, while, if desired, switch 33 may be operated to include condenser 34 across the terminals of meter 31, thereby effectively reducing the effective overall band width of the signal components being considered.

As stated above, the circuit is preferably so adjusted that condenser 22 will pass 100 per cent. of the signals translated by the triode section of tube 13, whereas the smaller condenser 26 will attenuate a portion of the low frequencies. By using condensers of different capacities, the filter action of condensers 22 and 26 can be varied to suit the particular use to which the system is to be put. The potential divider provided by resistor 24 enables the strength of the two signals translated by the individual channels to be made equal, thus to balance the meter. This resistor may be provided with a scale which indicates the percentage of total energy which must be passed by the condenser 22 to balance the energy passing through the channel including condenser 26 and therefore gives directly the ratio $$\frac{\text{Sound energy passing filters}}{\text{Total amplified sound energy}} \times 100$$

The frequency spectrum of normal heart sounds contains most of its energy in the very low frequencies. With a proper choice of circuit values, the meter 31 can be made to balance approximately at the mid-scale point thereof or at any other point desired. The system is particularly useful in the study of heart sounds and the manner in which they are affected by exercise, disease, therapeutic agents, industrial exposure to chemicals, malnutrition, etc.

The arrangement of Fig. 1 may be modified, if desired, to include the circuit of Fig. 2 by substituting the circuit of Fig. 2 for the portion indicated in the dotted rectangle 33 of Fig. 1. In making this substitution, terminals marked A, B and C of Fig. 1 are connected to correspondingly marked terminals of Fig. 2. The circuit of Fig. 2 comprises a three-pole double-throw switch having blades 39, 40 and 41, blade 39 being connected to terminal A, and blade 40 being connected to terminal B. Switch blade 41 is connected to one terminal of a resistor 42, the other terminal of resistor 42 being connected to the upper stationary contact for blade 40 and to the lower stationary contact for blade 39. An additional resistor 43 is provided and is connected between the upper contact for blade 39 and the lower contact for blade 40, a tap thereon being connected to terminal C. The upper contact for blade 41 is connected to the lower contact for blade 40, while the upper contact for blade 39 is connected to the lower contact for blade 41.

In considering the operation of the circuit of Fig. 2 in the system of Fig. 1, it will be seen that, with the blades 39, 40 and 41 in their upper position, the resistors 43 and 42 are connected in series in that order between the terminals A and B. It will also be seen that, with the blades 39, 40, 41 in the lower position, the resistors 42 and 43 are connected in series in that order between terminals A and B. The arrangement of Fig. 2, therefore, provides a convenient means for varying the effect of tap 43, thereby to provide additional flexibility in adjusting the system. In other words, by this arrangement more flexibility is provided for balancing the signals translated by the upper section of tube 25 against the signals translated by the lower section thereof.

It will be readily apparent to those skilled in the art that the diode of tube 13 can be omitted and the operation of the circuit otherwise maintained, providing sufficient grid current is drawn by tube 13 to charge condenser 14 in the manner required.

In summary, therefore, it will be seen that the system disclosed is suitable for indicating the relative content of a predetermined characteristic in two predetermined frequency spectrums, one of which is substantially contained within the other. As specifically described, the system is utilized to indicate the relative energy content of the sound components of an adequate sample of an entire heart spectrum and of a portion of this spectrum. The filter means including condenser 22 and resistor 23 thus comprises means for deriving and translating a first electrical signal corresponding to the content of one of the above-mentioned spectrums, specifically corresponding to the content of the entire spectrum of the sample of heart sounds. The filter means including condenser 26 and resistor 27 comprises means for deriving and translating a second electrical signal corresponding to the content of the other of the above-mentioned spectrums, specifically corresponding to the frequency spectrum containing the higher-frequency components of the sample of heart sounds. The upper section of tube 25 comprises a means, coupled to the filter means 22, 23 which derives and translates the above-mentioned first signal, for deriving a third signal varying in accordance with the content of the above-mentioned predetermined characteristic in the first electrical signal. Specifically, a signal is derived which varies in accordance with the entire energy content of the sample of the heart sounds or in accordance with the average amplitude of the frequency components of the above-mentioned first electrical signal. The lower section of tube 25 comprises means, coupled to the filter means 26, 27 which derives and translates the above-mentioned second signal, for deriving a fourth signal varying in accordance with the content of the above-mentioned predetermined characteristic in the second electrical signal. Specifically, a signal is derived which varies in accordance with the energy content of the frequency spectrum including the higher frequency components of the sample of heart sounds or in accordance with the average amplitude of the components included in the above-mentioned second electrical signal. Meter 31, therefore, is differentially responsive to the above-mentioned third and fourth signals for indicating the relative content desired.

While applicants do not intend to limit the invention to any particular circuit constants, the following circuit constants are given as illustrative of those which have been found to be of particular utility in a system of the type under consideration:

| | |
|---|---|
| Tube 11 | Type 1N 5-GT |
| Tube 13 | Type 1H 5-GT |
| Tube 18 | Type 1G 6-G |
| Tube 25 | Type 1G 6-G |
| Condenser 14 | 0.25 microfarad |
| Condenser 22 | 0.25 microfarad |
| Condenser 26 | 0.10 microfarad |
| Condenser 34 | 40 microfarads |
| Resistor 15 | 3 megohms |
| Resistor 23 | 500,000 ohms |
| Resistor 24 | 307,000 ohms |
| Resistor 27 | 500,000 ohms |
| Resistor 28 | 50,000 ohms |
| Resistor 29 | 12,000 ohms |
| Resistor 30 | 50,000 ohms |
| Resistor 32 | 10,000 ohms |
| Resistor 42 | 107,000 ohms |
| Resistor 43 | 200,000 ohms |

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A cardiometer for indicating the relative content of a predetermined characteristic in two predetermined frequency spectrums of heart sounds one of which is substantially contained within the other comprising, means for deriving and translating a first electrical signal corresponding to the content of one of said spectrums of heart sounds, means including a series condenser and a shunt resistor for deriving and translating a second electrical signal corresponding to the content of the other of said spectrums of heart sounds, means coupled to said means for deriving and translating said first signal for deriving a third signal varying in accordance with the content of said predetermined characteristic in said first electrical signal, means coupled to said means for deriving and translating said second signal for deriving a fourth signal varying in accordance with the content of said predetermined characteristic in said second electrical signal, and means differentially responsive to said third and fourth signals for indicating said relative content.

2. A cardiometer for indicating changes in the relative energy content in two predetermined frequency spectrums of heart sounds one of which is substantially contained within the other comprising, means for deriving and translating a first electrical signal corresponding to the energy content of one of said spectrums of heart sounds, means including a series condenser and a shunt resistor for deriving and translating a second electrical signal corresponding to the energy content of the other of said spectrums of heart sounds, means coupled to said means for deriving and translating said first signal for deriving a third signal varying in accordance with the average amplitude of said first electrical signal, means coupled to said means for deriving and translating said second signal for deriving a fourth signal varying in accordance with the average amplitude of said second electrical signal, and means differentially responsive to said third and fourth signals for indicating said relative energy content.

3. A cardiometer for indicating the relative average amplitude of signals in two predetermined frequency spectrums of heart sounds one of which is substantially contained within the other comprising, means for deriving and translating a first electrical signal corresponding to one of said spectrums of heart sounds, means including a series condenser and a shunt resistor for deriving and translating a second electrical signal corresponding to the other of said spectrums of heart sounds, means coupled to said means for deriving and translating said first signal for deriving a third signal varying in accordance with the average amplitude of said first electrical signal, means coupled to said means for deriving and translating said second signal for deriving a fourth signal varying in accordance with the average amplitude of said second electrical signal, and means differentially responsive to said third and fourth signals for indicating said relative average amplitude.

4. A cardiometer for indicating the relative amplitude of sound signals contained in two predetermined frequency spectrums of heart sounds one of which is substantially contained within the other comprising, means including a series condenser having a value of the order of 0.25 microfarad and a shunt resistor for deriving and translating a first electrical signal corresponding to the sound content of one of said spectrums, means including a series condenser having a value of the order of 0.10 microfarad and a shunt resistor having a value of the order of the value of said first-named resistor for deriving and translating a second electrical signal corresponding to the sound content of the other of said spectrums, means coupled to said means for deriving said first signal for deriving a third signal varying in accordance with the average amplitude of said first electrical signal, means coupled to said means for deriving said second signal for deriving a fourth signal varying in accordance with the average amplitude of said second electrical signal, and means differentially responsive to said third and fourth signals for indicating said relative amplitude.

5. A cardiometer for indicating the relative content of a predetermined characteristic in two predetermined frequency spectrums of heart sounds one of which is substantially contained within the other comprising, means for deriving and translating a first electrical signal corresponding to the content of one of said spectrums of heart sounds, means including a series condenser and a shunt resistor for deriving and translating a second electrical signal corresponding to the content of the other of said spectrums of heart sounds, means coupled to said means for deriving and translating said first signal for deriving a third signal varying in accordance with the content of said predetermined characteristic in said first electrical signal, means coupled to said means for deriving and translating said second signal for deriving a fourth signal varying in accordance with the content of said predetermined characteristic in said second electrical signal, and means for adjusting the relative amplitude of said third and fourth signals and for differentially combining them to indicate said relative content.

6. A cardiometer for indicating the relative content of a predetermined characteristic in two predetermined frequency spectrums of heart sounds one of which is wholly contained within the other comprising, means for deriving and translating a first electrical signal corresponding to the content of the wider of said spectrums of heart sounds, band-pass selector means including a series condenser and a shunt resistor coupled to said last-named means for deriving therefrom and for translating a second electrical signal corresponding to the content of the other of said spectrums of heart sounds, means coupled to said means for deriving and translating said first signal for deriving a third signal varying in accordance with the content of said predetermined characteristic in said first electrical signal, means coupled to said band-pass selector for deriving a fourth signal varying in accordance with the content of said predetermined characteristic in said second electrical signal, and means differentially responsive to said third and fourth signals for indicating said relative content.

7. A cardiometer for indicating the relative content of a predetermined characteristic in two predetermined frequency spectrums of heart sounds one of which is substantially contained within the other comprising, means for deriving and translating a first electrical signal corresponding to the content of one of said spectrums of heart sounds, means including a series condenser and a shunt resistor for deriving and translating a second electrical signal corresponding to the content of the other of said spectrums of heart sounds, means for reducing the effect of undesired components of low amplitude such as sound components due to breathing and muscle tremors on said first and second electrical signals, means coupled to said means for deriving and translating said first signal for deriving a third signal varying in accordance with the content of said predetermined characteristic in said first electrical signal, means coupled to said means for deriving and translating said second signal for deriving a fourth signal varying in accordance with the content of said predetermined characteristic in said second electrical signal, and means differentially responsive to said third and fourth signals for indicating said relative content.

8. A cardiometer for indicating the relative content of a predetermined characteristic in two predetermined frequency spectrums of heart sounds one of which is substantially contained within the other comprising, means for deriving and translating a first electrical signal corresponding to the content of one of said spectrums of heart sounds, means including a series condenser and a shunt resistor for deriving and translating a second electrical signal corresponding to the content of the other of said spectrums of heart sounds, means having a fast response and a slow recovery for reducing the effect of undesired components of relatively low amplitude such as sound components due to breathing and muscle tremors on said first and second electrical signals, means coupled to said means for deriving and translating said first signal for deriving a third signal varying in accordance with the content of said predetermined characteristic in said first electrical signal, means coupled to said means for deriving and translating said second signal for deriving a fourth signal varying in accordance with the content of said predetermined characteristic in said second electrical signal, and means differentially responsive to said third and fourth signals for indicating said relative content.

9. A cardiometer for indicating the relative content of a predetermined characteristic in two predetermined frequency spectrums of heart sounds one of which is substantially contained within the other comprising, means for deriving and translating a first electrical signal corresponding to the content of one of said spectrums of heart sounds and including a series condenser and a shunt resistor for deriving and translating a second electrical signal corresponding to the content of the other of said spectrums of heart sounds, amplifying means comprising a grid current rectifier in said first-named means for reducing the effect of undesired components of relatively low amplitude such as sound components due to breathing and muscle tremors on said first and second electrical signals, means coupled to said amplifying means for deriving a third signal varying in accordance with the content of said predetermined characteristic in said first electrical signal, means coupled to said amplifying means for deriving a fourth signal varying in accordance with the content of said predetermined characteristic in said second electrical signal, and means differentially responsive to said third and fourth signals for indicating said relative content.

JOHN H. FOULGER.
PAUL E. SMITH, Jr.